April 12, 1960  M. F. PETERS  2,932,203
FLUID PRESSURE SYSTEMS
Filed March 16, 1954  2 Sheets-Sheet 1

INVENTOR.
Melville F. Peters
BY
ATTORNEY

April 12, 1960

M. F. PETERS 2,932,203

FLUID PRESSURE SYSTEMS

Filed March 16, 1954

INVENTOR.
Melville F. Peters

BY

ATTORNEY

United States Patent Office 2,932,203
Patented Apr. 12, 1960

2,932,203
FLUID PRESSURE SYSTEMS
Melville F. Peters, Livingston, N.J.
Application March 16, 1954, Serial No. 416,463
9 Claims. (Cl. 74—18.2)

This invention relates to combining flexible fluid seals or bellows with rigid fluid chambers, springs and fluids, so that the system consisting of rigid chambers, flexible fluid seals or bellows, springs and fluids, can seal equipment operating at a higher pressure than the safe working pressure of any one of the flexible sealing elements.

Equipment operating at high fluid pressures must have a high factor of safety, long life and generally a large movement of the flexible sealing element is desirable. At low pressures these conditions can usually be obtained with relatively short bellows. As the pressure is increased the thickness of the flexible membranes must eventually be increased to limit the stress developed on their surfaces to a value which is within the proportional limit. If these membranes are in the form of washers and the inner peripheries of the washers are welded together to form pairs and the outer peripheries of the pairs are welded together to form a bellows, it can be assumed that the bellows consists of a plurality of washers or discs with the inner and outer peripheries or edges fixed. The movement of these bellows will be equal to the sum of the deflections of the discs (where the deflection of each disc is limited to the displacement the disc can make without the stresses on its surfaces exceeding a specified value, when the forces produced on the inner and outer peripheries by the fluid acting on the discs are balanced by limiting the movement of the bellows).

When it is undesirable to change the thickness of the disc material to accommodate higher operating pressures, it is still possible to limit the stresses in the bellows at the higher pressures to some predetermined value by decreasing the difference between the outside and the inside diameters of the bellows discs. Decreasing this difference between the diameters however, reduces the permitted deflection, so that this method of maintaining a predetermined stress at high fluid pressures will also lead to the same disadvantage as the method of increasing the thickness of the discs, since both methods reduce the deflection of the bellows while maintaining the stress at a predetermined value. In practice it is advantageous to change both the thickness of the material and the ratio between the inside and outside diameters of the discs to accommodate changes in pressure.

It is therefore the first object of the invention to distribute a fluid pressure over a plurality of bellows, so that the pressure applied to each bellows shall never exceed the safe working pressure P of the bellows.

It is therefore another object of the invention to maintain the ordered drop in pressure through adjacent chambers in the flexible fluid seal by connecting a separate pressure chamber to each chamber in the flexible fluid seal, so that the pressure across each fluid seal shall at all times be limited to the safe operating pressure of the seal.

The graduated decrease in pressure can be maintained between adjacent or contacting flexible fluid seals in the seal assembly by hermetically sealing fluid into each chamber at some predetermined pressure. The fluid sealed into the chambers may be in the gaseous state, liquid state, or a combination of the two states. When the fluid sealed into the chambers is in the gaseous state and the pressure is decreased in ordered sequence from one end of the seal to the other end, the number of bellows should be limited, because the sealing pressure of the bellows contacting the high pressure chamber should not exceed the safe working pressure of the bellows, if the seal is to operate on a high pressure system and not fail when the high pressure is removed, since a reduction of the pressure in the high pressure chamber subjects the bellows to a pressure drop equal to the sealing pressure minus the ambient pressure, which is generally 14.7 p.s.i. or less.

When the fluid is a liquid, a finite change in pressure produces only an infinitesimal change in volume, so that an increase in volume of a chamber, or a decrease in volume of the liquid by an infinitesimal amount, will reduce the pressure in the chamber to practically zero. When this loss in pressure takes place in one of the chambers hermetically sealed with liquid and the chamber is one of the $n$ chambers which are sealed with the pressure decreasing in ordered sequence from one end of the seal to the other end, the pressure drop in the bellows sealing the high pressure side of the chamber will increase from the allowable pressure P, to $(\alpha+1)$ P, where $\alpha$ is the number of bellows on the low pressure side of the chamber at zero pressure. If the volume of a chamber is decreased, or the volume of the fluid is increased by an infinitesimal amount, there will be an increase of pressure in the chamber which can reach the bursting pressure of the bellows. These relative changes in volume between the chamber and the fluid with their detrimental effects, can be produced by a movement of the elements of the seal such as takes place when a valve is opened or closed, or by a change in temperature. When each chamber is supplied with an expansion chamber, these relative changes between the volume of the chamber and the volume of the liquid can take place without over stressing the elements of the fluid seal.

It is therefore a further object of the invention to maintain the ordered drop in pressure through adjacent chambers in the flexible fluid seal by sealing fluids into chambers in the gaseous state, so that the pressure in adjacent chambers shall progressively change from one end of the seal to the other end.

It is an object of the invention to use expansion chambers in combination with a series of bellows, chambers, springs and liquids, so that when a pressure is applied to one end of the sealing unit, an ordered pressure drop will take place from the high pressure end of the unit to the low pressure end of the unit, without over stressing the flexible membranes and when the relative position of the elements of the seal are changed, or the seal experiences a change in temperature, the drop in pressure across each of the bellows in the system will remain below a predetermined value.

It is still another object of the invention to arrange a plurality of flexible chambers in a valve which are independent of the position of the valve stems within the manufacturing tolerance of the parts forming the chambers, so that when the valve stem is moved in opening and closing the valve, the volume of the plurality of chambers does not change individually or collectively.

The invention consists of the construction, combination and arrangement of parts, as herein illustrated, described and claimed.

In the accompanying drawings, forming a part hereof are illustrated three forms of embodiment of the invention.

Figure 1:
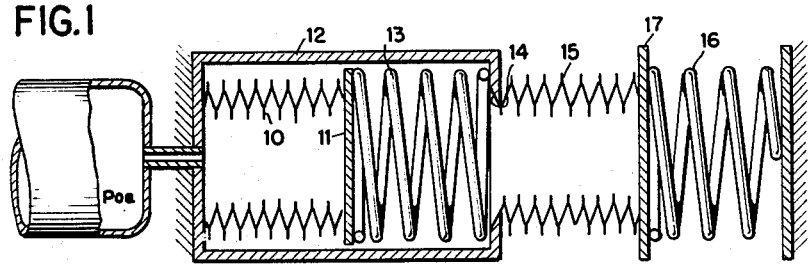
Figure 1 is a cross sectional view of a bellows assembly illustrating certain principles incorporated in the present invention.

Referring to Figure 1, there is illustrated a device in which an applied pressure $P_{oa}$ coming from a tank or any source of pressure is led into a bellows 10 which is capable of withstanding only a portion of the initial pressure. As an example, the initial pressure may be 200 lbs. per sq. inch and the bellows 10 only capable of withstanding 100 lbs. per sq. inch. The free end of the bellows is sealed by a plate 11 and a housing 12 surrounds the bellows 10 and plate 11. A coil spring 13 is disposed between the end of the housing 12 and the plate 11. The spring 13 exerts a force against the plate 11 which is equal to the differential between the safe operating pressure of the bellows 10 and the input pressure of $P_{oa}$ from the tank which, in the given example, is 200 lbs. per sq. inch. The housing 12 is open at the spring end thereof as indicated at 14 and a second bellows 15 is welded around the opening. The second bellows is pressurized with a fluid at a pressure equal to the force necessary to establish equilibrium between the bellows assembly 10, 15, and spring 13. In the given example where the initial pressure $P_{oa}$ is 200 lbs. per sq. inch, and the safe operating pressure of bellows 10 is 100 lbs. per sq. inch, the pressure within the bellows 15 will also be 100 lbs. per sq. inch. The fluid within the bellows 15 fills the housing 12 around the bellows 10 and the spring 13.

Where the fluid within the bellows 15 is a liquid, it is necessary to provide a spring 16 at the free end of the bellows 15, in order that the bellows 10 and 15 can move longitudinally in the assembly. Where the fluid in the bellows 15 is a gas the plate 17 which seals the end of bellows 15 may be fixed.

Figure 2:
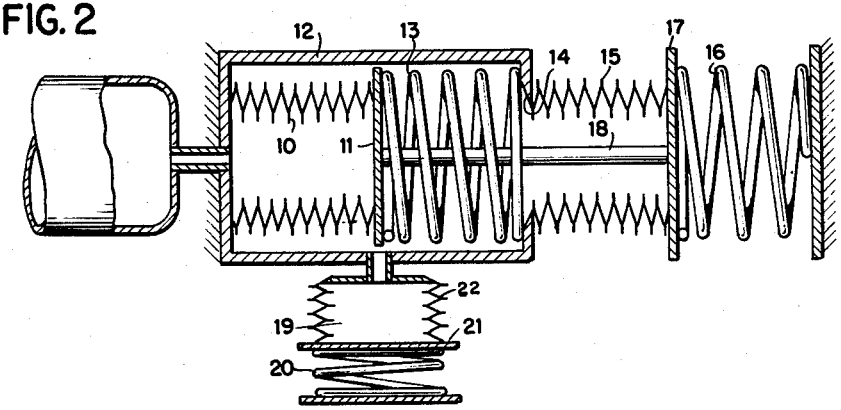
Figure 2 is a cross sectional view showing the two bellows in Figure 1 connected with a rod and an expansion chamber in fluid contact with the sealed chamber, illustrating another embodiment of the invention.

Referring to Figure 2, there is shown an embodiment which differs from Figure 1 only in that there is a connecting rod 18 which rigidly interconnects the plates 11 and 17 and a chamber 19 which acts as an expansion chamber and communicates with the interior of the housing 12.

Figure 4:
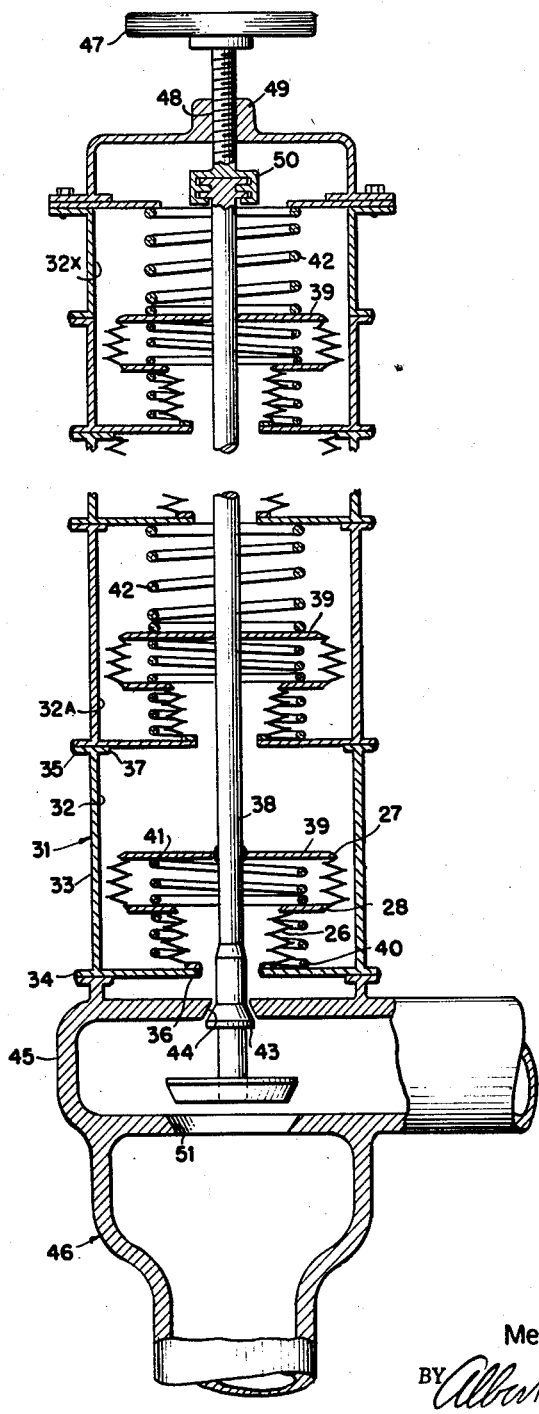
Figure 4 is a cross sectional view of a valve using a plurality of bellows of the type shown in Figure 3 working in series, an embodiment of the invention.

The rod 18 may be for example, the valve stem illustrated in Figure 4 and passes through a rigid connection between the plates to which the bellows are secured. Where the housing 12 and the bellows 15 are filled with a liquid and the plates 11, 17, are caused to move longitudinally of the said housing together by reason of their being coupled, a differential in pressure will exist in all cases where the effective area of the bellows 10, and 15, are not identical. This action will become clearer when it is observed that due to the incompressible nature of the liquid within the housing and the fact that the plates 11, 17, are rigidly interconnected, a movement of the said plates will, unless the bellows are exactly the same in their effective areas, result in a pressure so great that it will burst the bellows. Under conditions where the volume of the liquid in the housing is decreased and when the volume is increased, the pressure differential of 200 p.s.i. takes place across the bellows 10 and the bellows would be destroyed. It is therefore necessary to insert the expansion chamber 19 into the housing 12 to receive fluid when the overall volume of the liquid in the housing is increased and to supply fluid to the housing 12 when the overall volume of the liquid in the housing is increased. In this embodiment a spring 20 is provided which bears against a plate 21 which seals the end of the expansion chamber bellows 22 and exerts a pressure equal to the pressure within the housing 12 multiplied by the effective area of the bellows 22. The spring 16 on the other hand, exerts a force against the plate 17, equal to the pressure within the housing 12 multiplied by the effective area of the bellows 15.

Figure 3:
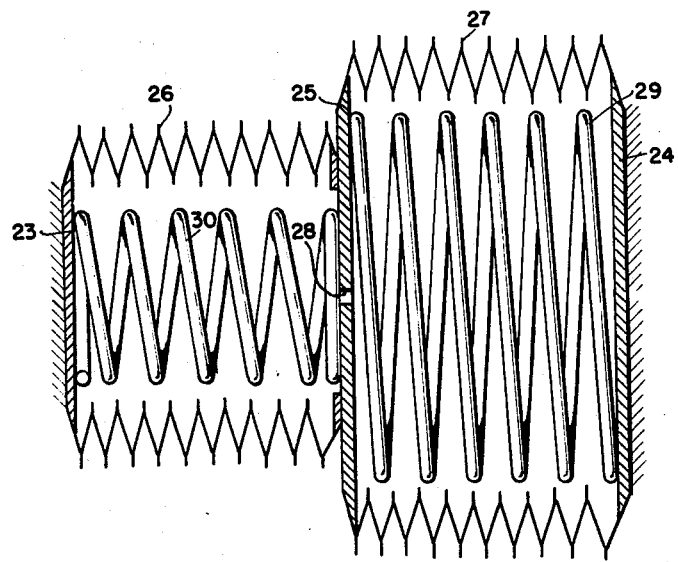
Figure 3 is a cross sectional view showing a bellows combination with two piston areas which can change in volume without changing in overall length, an embodiment of the invention.

It is now desired to apply the principles discussed in Figures 1 and 2, to a valve assembly and for this purpose the structure illustrated in Figure 3 has been provided. The structure of Figure 3 accomplishes with two bellows what was done in Figure 2 by the use of three bellows, and three springs. It is to be understood that the bellows assembly in Figure 3 has a housing therearound similar to the housing 12 shown in Figures 1 and 2.

In Figure 3, end plate 23, and end plate 24, are fixed with respect to each other. A movable plate 25 is disposed between the bellows assembly 26, 27, and is centrally bored as indicated at 28 to permit the passage of fluid between the two bellows in the assembly. The entire inside of the assembly is filled with a suitable fluid. A spring 29 is disposed between the end plate 24 and the movable plate 25. A second spring 30 is disposed between the end plate 23 and the movable plate 25. Both springs 30 and 29 are located within the bellows assembly 26, 27, respectively. The springs 29, 30, in the embodiment shown in Figure 3 take the place of springs 13, 16, in Figures 1 and 2. It is to be noted that the bellows assemblies 26, 27, are of different piston or effective areas. As a result of the different effective areas of the two bellows assemblies it is possible to have one of the end plates 23, or 24, fixed, the bellows assemblies filled with a non-compressible liquid and move the other end plate without destroying the bellows assemblies. An examination of the structure of Figure 3 will show that if end plate 23 is moved in the direction of end plate 24, the fluid within the bellows assembly 26, 27, will be stressed causing the central plate 25 to be moved in the direction of end plate 23. The smaller bellows 26 will thus be compressed, and the larger bellows 27 will elongate with the result that the initial volume will be maintained although the overall distance between the end plates 23, 24, may be decreased. This behaviour is possible by reason of the fact that the small area bellows has been compressed while the large area bellows has been expanded. The converse is also true where the end plates 23, 24, are moved away from each other. In this example the pressure within the housing 12 will compress the large effective area bellows 27 and permit the smaller bellows 26 to elongate. The springs 29, 30, within the bellows assembly 26, 27, supply the force to the supporting surfaces which they abut, which forces, together with the internal pressure of the fluid must equal the force applied by the externally applied pressure acting upon the assembly.

Referring now to Figure 4, there is illustrated a specific application of the principles hereinabove described utilizing the bellows assembly shown in Figure 3 in a valve. The application of the present invention shown in Figure 4 illustrates the manner in which bellows may be connected in series for the purpose of controlling a high pressure fluid by means of low pressure bellows. This control is accomplished by reason of the fact that the total high pressure may be divided between the series of bellows assemblies so that each bellows assembly only handles a portion of the total pressure. Thus, if two bellows assemblies are used, the total pressure is divided equally between the assemblies. If three bellows assemblies are used each bellows assembly handles only ⅓ of the total pressure and so forth. Referring to Figure 4, there is shown a housing 31 which corresponds to the housing 12 discussed in Figures 1 and 2. The housing is provided with a series of compartments 32, 32A—32X. Each of the compartments 32, 32A—32X, consists of a cylindrical wall 33 and supporting shoulders 34, 35, at each end thereof. The supporting shoulders 34, 35, are provided with openings 36, 37, large enough to receive the valve stem 38 therethrough. One end of the smaller of the bellows assemblies 26 is welded around one of the openings 36 in the supporting shoulder 34 with the valve stem 38 extending through the center of the bellows 26. It is to be understood that the construction of the bellows herein described in each of the chambers is substantially the same. The large diameter bellows 27 is welded to a plate 28 which in turn is connected to the free end of the small bellows 26. The opposite end of the larger bellows 27 is welded to a fixed plate 39 which in turn is welded to the valve stem 38. The springs 40, 41, shown in Figure 4 in the lowermost chamber 32, correspond in function to the springs 29, 30, hereinabove discussed in connection with Figure 3. However, for the sake of convenience in construction the spring 40 is disposed around the smaller bellows 26 rather than within it as shown in Figure 3. The springs 42, shown in chambers 32A—32X, disposed between the plate 39 and the top of said chambers are interposed for the purpose of making it easier to open or close the valve structure. These springs are not essential to the operation of the device and do not effect the behavior of the bellows assembly.

It is essential to note at this point that the bellows assembly contained in each of the chambers should be identical for the best performance of the valves. Considering now the operation of the valve shown in Figure 4, and assuming that all of the chambers and bellows assemblies are filled with a liquid, it will be seen that as the valve stem 38 is raised the volume within the chamber 32 will decrease and the volume within the bellows assembly in chamber 32A will increase by approximately the same amount as the volume decreases in chamber 32. The liquid in chamber 32 passes into the bellows assembly in chamber 32A. If the two bellows assemblies in chamber 32 and 32A were exactly alike the decrease in volume in 32 would be exactly equal to the increase in volume in 32A. However, it is not possible to construct the bellows assemblies to have equal volumes throughout their working length. In addition to this, there are changes in temperature which cause the liquid in compartments 32, 32A—32X to change in volume and consequently it is necessary to have bellows assemblies which will compensate for all of these volume changes which take place in the different compartments. This compensation can be accomplished by means of an external expansion chamber as shown in Figure 2 or by means of the more practical two diameter bellows assembly illustrated in Figures 3 and 4.

When the valve is fully opened the sealing valve disc 43 will seat within the sealing valve disc opening 44 in the valve housing 45. The fluid passing through the valve 46 will then be sealed off from the bellows assembly within chamber 32. The fluid within the bellows assembly in chamber 32 will also be sealed from the fluid passing through the valve 46.

Under normal valve construction it would be necessary to provide an expansion chamber for the fluid within the compartment bellows assembly to protect the bellows from destruction in the event that the fluid therein expanded. However, by the use of the diameter bellows assemblies as shown and described in Figure 4, the bellows assemblies will compensate for the expansion of the fluid therein as hereinabove described in connection with Figure 3.

The behavior of the bellows assemblies described in connection with chamber 32 and 32A, is the same throughout each of the chambers in the housing 31. Each of the bellows assemblies acting to handle its proportion of the total pressure between the valve 46 and the ambient pressure. When the valve is closed as by rotating the valve handle 47 to cause the valve actuating rod 48 to move downwardly through the nut 49 and acting through the coupling 50 to force the stem 38 downwardly upon the valve seat 51, without permitting the valve stem to rotate, the following sequence of bellows action will take place. The fluid within the chamber 32, 32A—32X, will increase in volume because of the fact that the bellows assemblies therein will be decreased in their overall length by the descent of the valve stem 38. The fluid within the bellows assemblies 26, 27, in chambers 32, 32A—32X, etc., decreases by an amount equal to the increase of the volume of the fluid in chambers 32, 32A—32X, except for the slight differential in volume brought about by differences in manufacturing tolerances.

The fluid in the lowermost bellows assembly in chamber 32 will escape back into the valve housing 45 and can be disregarded. These differences in manufacturing tolerances will be compensated for by means of the two diameter bellows throughout the assembly and spread over the entire construction so that the bellows therein are maintained within their safe operating tolerances.

While the foregoing description has been directed to the use of fluids within the bellows assemblies it is to be understood that gases and mixtures of liquids and gases are contemplated by the term fluids.

In addition, the springs 40, 41, described in connection with Figure 4 may have varying forces to exert varying forces of restitution on the bellows assemblies.

Having thus fully described the invention, what is claimed as new and desired to be secured by Letters Patent of the United States, is:

1. In a valve sealing apparatus for a fluid pressure system including a housing, a plurality of bellows assemblies in said housing arranged in series and dividing said housing into a plurality of chambers providing means for distributing a pressure equal to the applied pressure in the system over the bellows assemblies to limit the pressure on any individual bellows assembly to a value not in excess of the safe working pressure for said bellows assembly.

2. In a valve sealing apparatus for a fluid pressure system including a housing, a series of adjacent chambers in said housing, a plurality of bellows assemblies in said housing chambers arranged in series providing means for distributing a pressure equal to the applied pressure in the system over the bellows assemblies to limit the pressure on any individual bellows assembly to a value not in excess of the safe working pressure for said bellows assembly.

3. In a valve sealing apparatus for a fluid pressure system comprising a housing, a plurality of adjacent chambers in said housing, a series of bellows assemblies within each of said chambers providing means for distributing a pressure equal to the applied pressure in the system over the bellows assemblies to limit the pressure on any individual bellows assembly to a value not in excess of the safe working pressure for said bellows assembly.

4. In a valve sealing apparatus for a fluid pressure system comprising a housing, a plurality of adjacent chambers in said housing, two bellows of different diameters in communication with each other within each of said chambers, providing means for distributing a pressure equal to the applied pressure in the system over the bellows assemblies to limit the pressure on any individual bellows assembly to a value not in excess of the safe working pressure for said bellows assembly.

5. In a valve sealing apparatus for a fluid pressure system comprising a housing, a plurality of adjacent chambers in said housing, two bellows of different diameters in communication with each other within each of said chambers, springs in each of said chambers between the top of said chambers and the bellows assemblies, the arrangement of said bellows in said chambers providing means for distributing a pressure equal to the applied pressure in the system over the bellows assemblies to limit the pressure on any individual bellows assembly to a value not in excess of the safe working pressure for said bellows assembly.

6. A valve sealing system according to claim 3 wherein successive bellows assemblies include discs of different diameters forming unequal piston areas for said successive bellows assemblies.

7. A valve sealing system according to claim 3 wherein successive bellows assemblies include discs of different diameters forming unequal piston areas for said successive bellows assemblies, and springs of varying forces to exert varying forces of restitution.

8. In a valve sealing apparatus for a fluid pressure system comprising a housing, a plurality of adjacent chambers in said housing, a valve stem traversing said chambers, two bellows of different diameters in communication with each other within each of said chambers, and attached at one end to the valve stem so that movement of the valve stem does not change volumetric capacity of the chambers, the arrangement of said bellows in said chambers providing the means for distributing a pressure equal to the applied pressure in the system over the bellows assemblies to limit the pressure on any individual bellows assembly to a value not in excess of the safe working pressure for said bellows assembly.

9. A valve assembly according to claim 8 in which a fluid expansion chamber is connected to each of said bellows chambers to absorb volumetric changes produced by movements of said valve stem.

References Cited in the file of this patent

UNITED STATES PATENTS

| | | |
|---|---|---|
| 42,430 | Boyle | Apr. 19, 1864 |
| 2,229,418 | Mason | Jan. 21, 1941 |
| 2,308,183 | Lewis et al. | Jan. 12, 1943 |
| 2,439,957 | Anderson | Apr. 20, 1948 |
| 2,444,703 | Jones | July 6, 1948 |
| 2,495,081 | Thomas | Jan. 17, 1950 |
| 2,652,223 | Peters | Sept. 15, 1953 |

FOREIGN PATENTS

| | | |
|---|---|---|
| 774,795 | Great Britain | 1957 |
| 143,954 | Great Britain | 1951 |